Oct. 21, 1958     C. W. BERTHIEZ     2,856,834
MILLING AND BORING MACHINE EQUIPPED FOR GEAR-CUTTING
Filed Dec. 5, 1951     8 Sheets-Sheet 1

INVENTOR
Charles William Berthiez
By
                ATTORNEY

INVENTOR
Charles William Berthiez

Oct. 21, 1958 C. W. BERTHIEZ 2,856,834
MILLING AND BORING MACHINE EQUIPPED FOR GEAR-CUTTING
Filed Dec. 5, 1951 8 Sheets-Sheet 3

INVENTOR
Charles William Berthiez
By George H. Borey
ATTORNEY

Oct. 21, 1958　　　　　C. W. BERTHIEZ　　　　　2,856,834
MILLING AND BORING MACHINE EQUIPPED FOR GEAR-CUTTING
Filed Dec. 5, 1951　　　　　　　　　　　　　　8 Sheets-Sheet 6

INVENTOR
Charles William Berthiez
By George H. Corey
ATTORNEY

Oct. 21, 1958 C. W. BERTHIEZ 2,856,834
MILLING AND BORING MACHINE EQUIPPED FOR GEAR-CUTTING
Filed Dec. 5, 1951 8 Sheets-Sheet 7
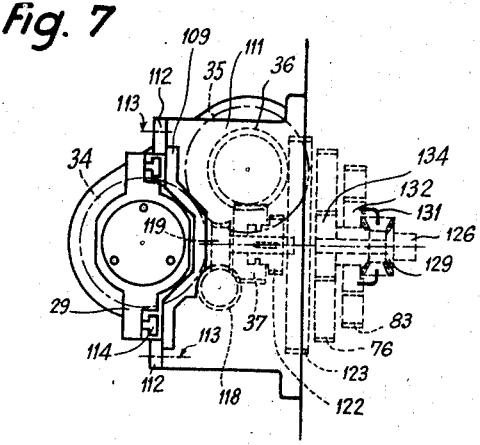
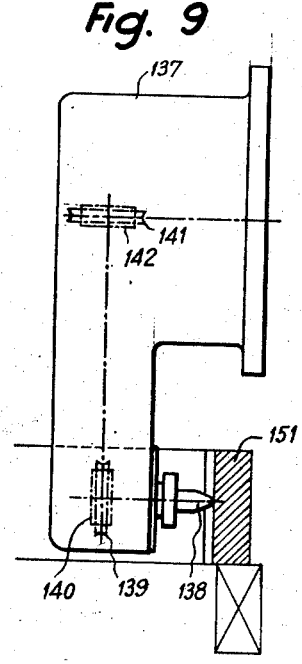 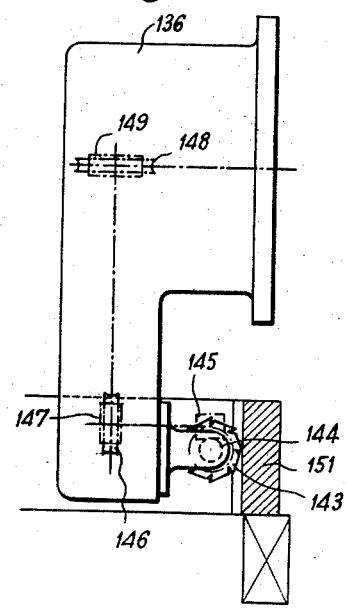
INVENTOR
Charles William Berthiez
By
ATTORNEY

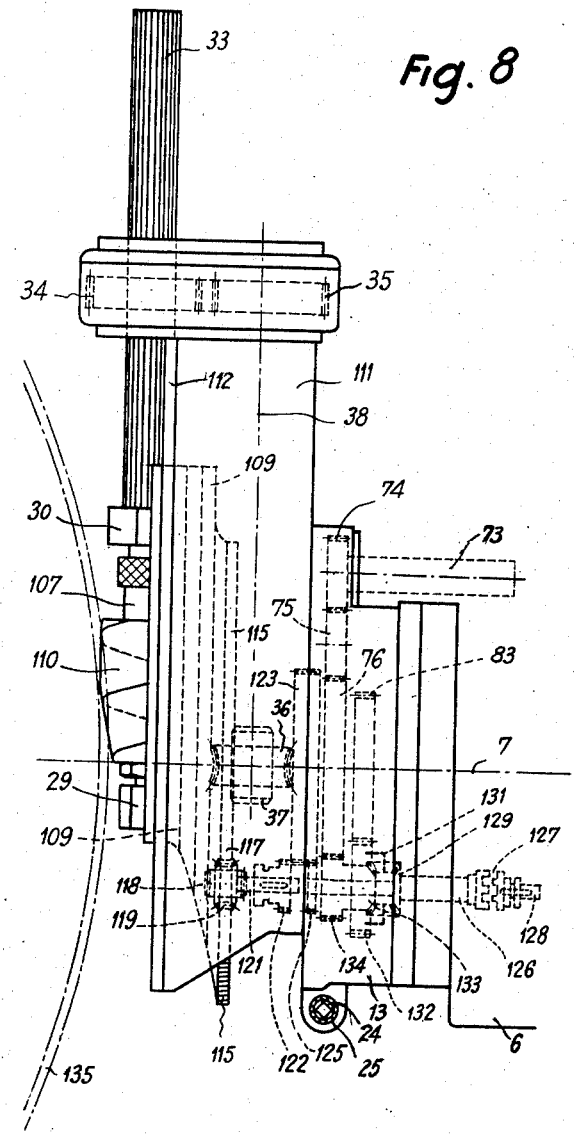

United States Patent Office 2,856,834
Patented Oct. 21, 1958

2,856,834

MILLING AND BORING MACHINE EQUIPPED FOR GEAR-CUTTING

Charles William Berthiez, Bizy-Vernon, France, assignor to Societe Nouvelle de Construction de Machines-Outils et d'Outillage Procedes C. W. B., Paris, France, a societe anonyme Application December 5, 1951, Serial No. 260,076

Claims priority, application France February 17, 1951

7 Claims. (Cl. 90—4)

The object of the invention is a milling and boring machine adapted for gear-cutting operations.

The invention is applicable to milling and boring machines fitted with a rotary horizontal table.

The improvement which forms the object of the present invention consists in a milling and boring machine fitted with a rotary workpiece-carrying table and comprising a gear-cutting head adapted to be mounted on the machine headstock, said gear-cutting head being provided with a milling cutter arbor rotatably driven from the machine spindle.

Preferably, the rotary workpiece-carrying table is provided with a rotational feed device driven by the machine spindle.

According to a further feature of the invention, the rotational feed device of the table carrying the workpiece is connected to the machine spindle through a differential connected to the device controlling the feed of the cutter with respect to the workpiece.

Further features of the invention will become apparent from the following description and also from the accompanying drawing which is given merely as an example and in which Fig. 1 is a diagrammatic and elevational view of a milling and boring machine equipped with a device according to the invention adapted to cut spur wheels either helical or straight.

Fig. 7 is an elevational view of a variation of the cutting head represented in Fig. 2.

Fig. 8 is the corresponding top view.

Figs. 9 and 10 show heads for internal cutting adapted to be used with an end-mill and a plain gear cutter respectively.

In Figs. 1 to 6 is shown a milling and boring machine fitted with a rotary table which, in the example represented, is driven by a powerful control gear allowing vertical turning operations to be performed. With reference to said figures, a description will be made of some embodiments according to the invention by means of which it is possible to perform gear-cutting operations with tools such as hobbing cutters, taper hobs, end-mills, form gear-cutters, etc. It is understood that the invention would also be applicable to milling and boring machines, the rotary table of which is equipped merely with a control or indexing gear instead of a powerful driving gear, which causes the table to rotate at cutting speed in order to carry out vertical turning operations.

Figure 1:
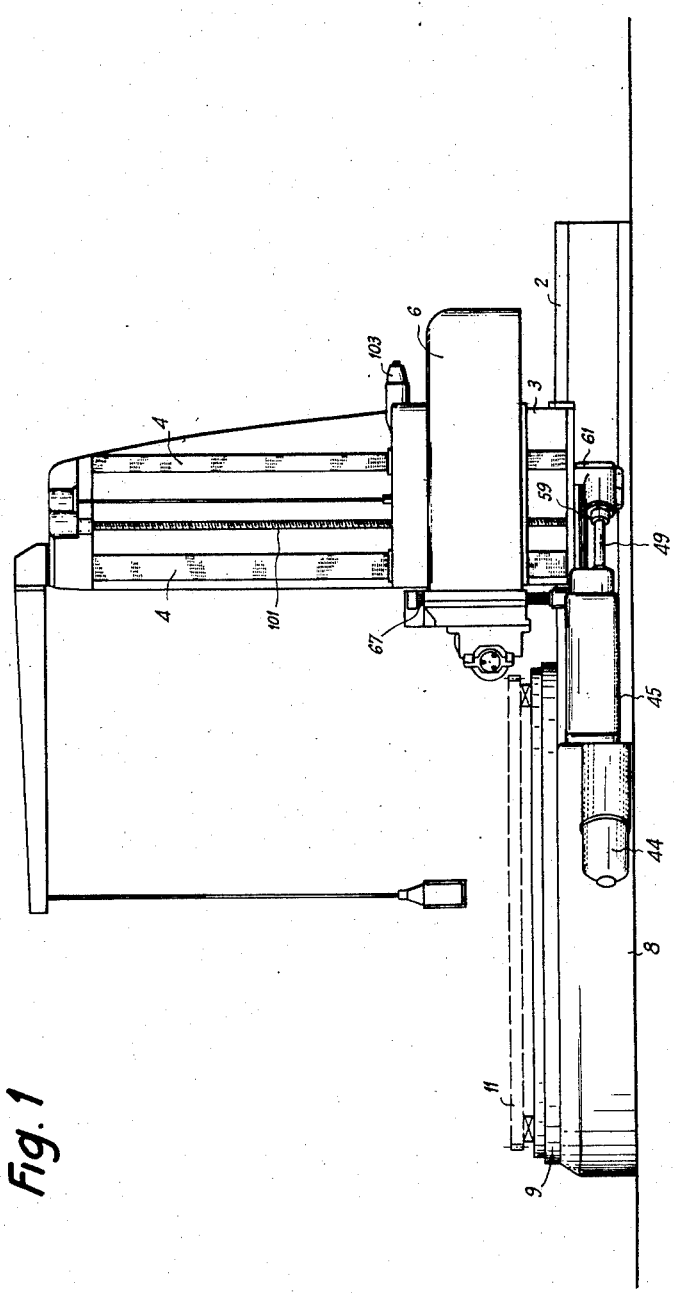
Figure 2:
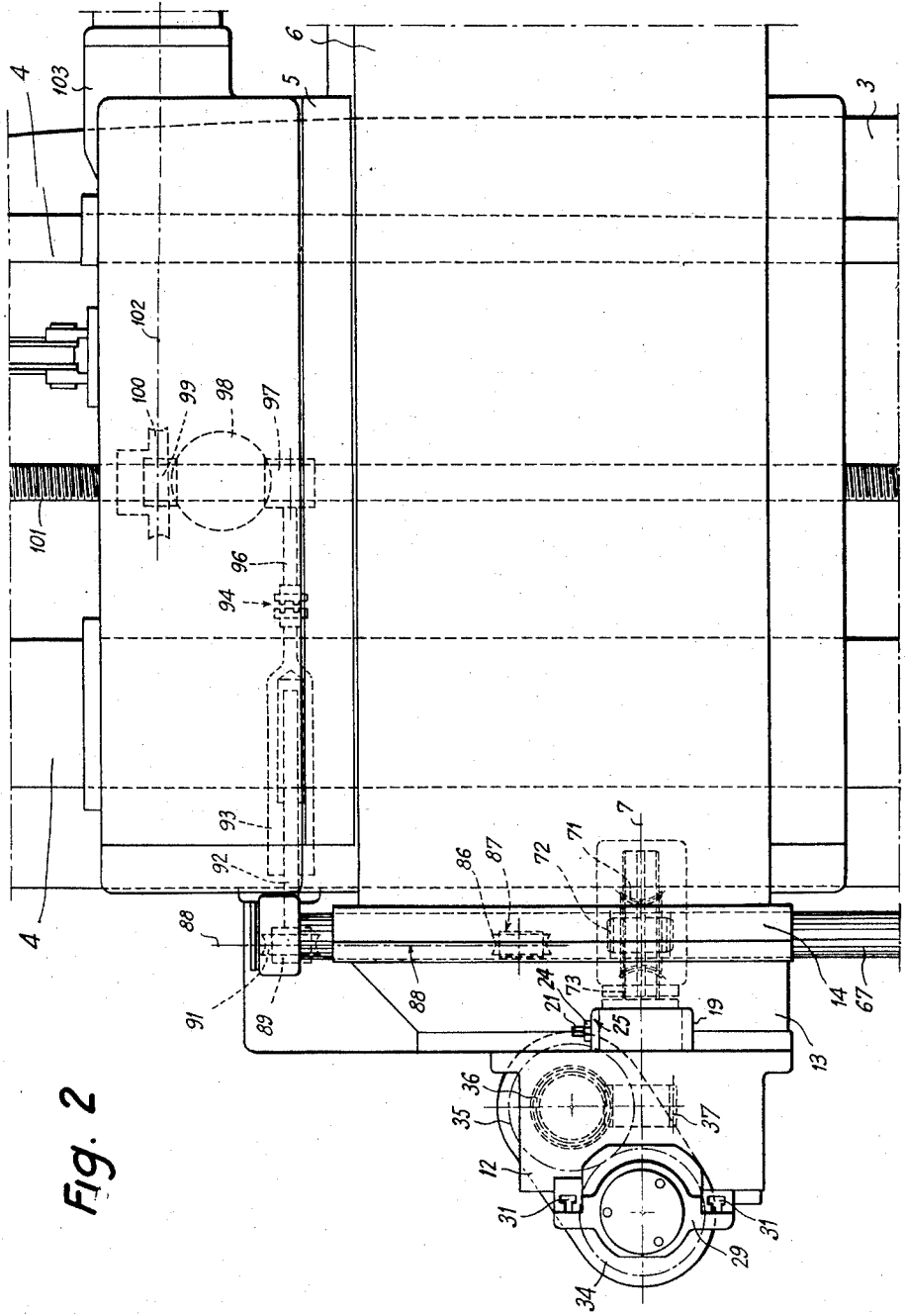
Fig. 2 is an elevational view, on a larger scale, of a portion of the milling and boring machine of Fig. 1, namely the portion which carries the gear-cutting head.
Figure 5:
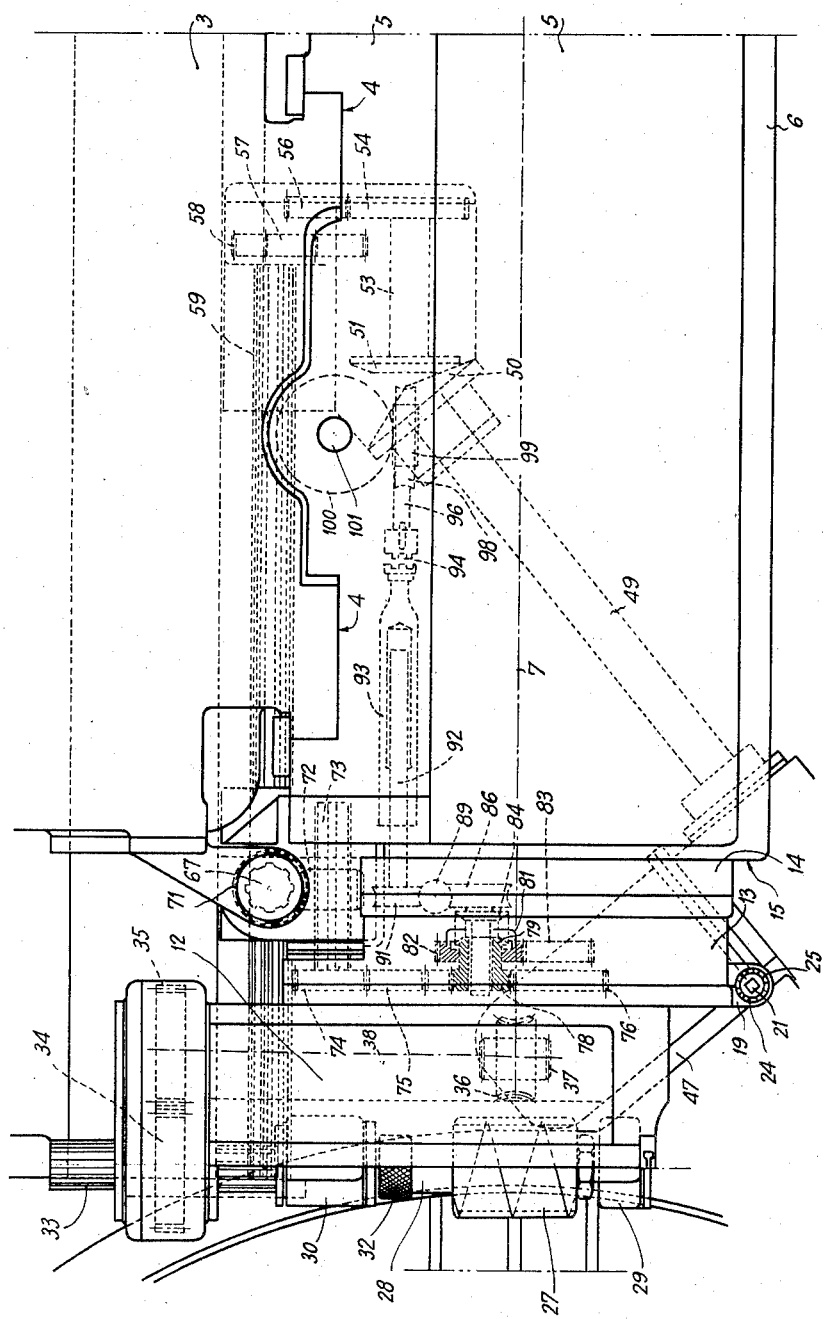
Fig. 5 is a top view, on a larger scale, of a portion of Fig. 4 corresponding to the cutting head and to the connection between the device which provides for vertical movement of the headstock, and the device which ensures the rotation of the table.
Figure 6:
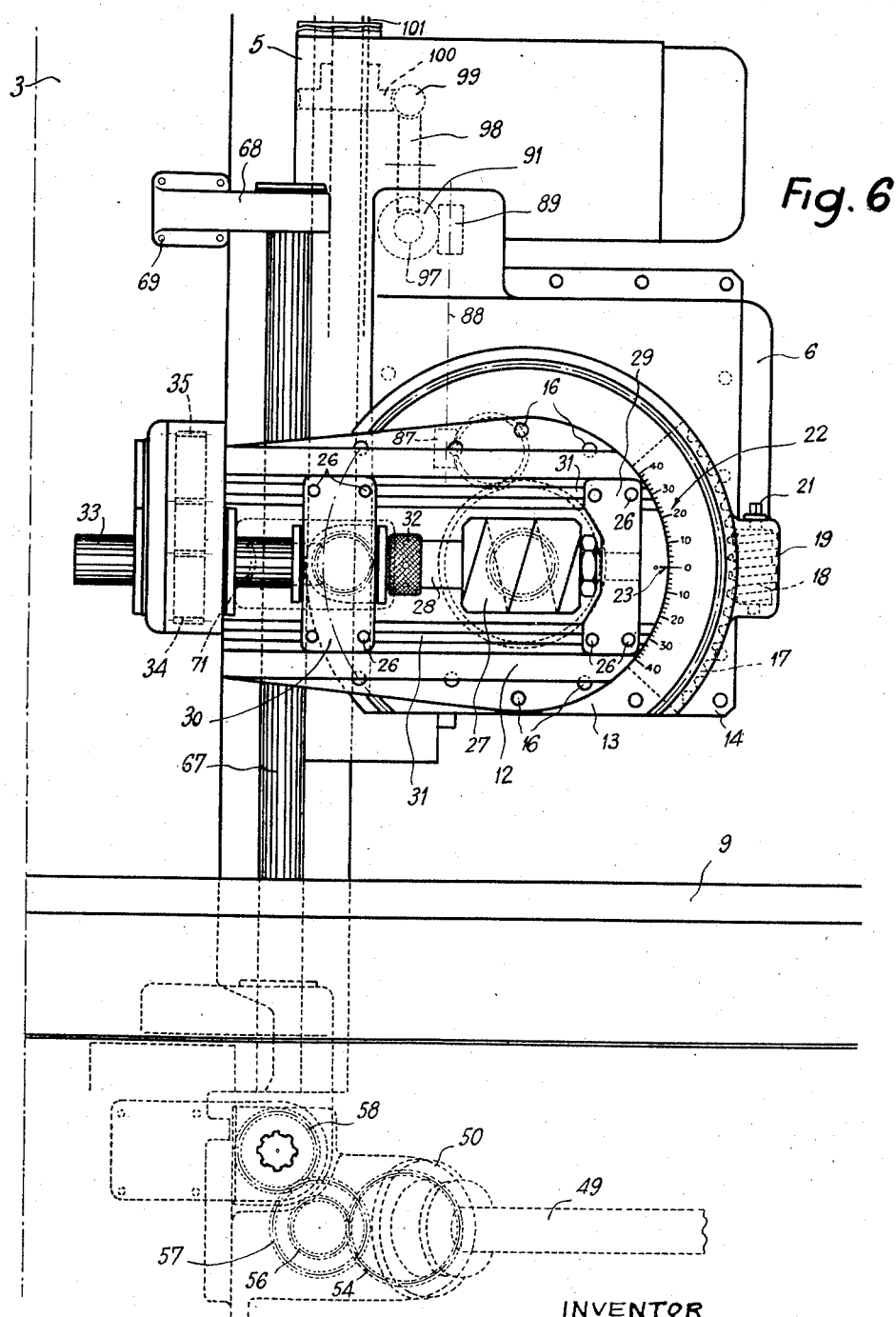
Fig. 6 is a side view corresponding to Figs. 2 and 3.

The milling and boring machine represented in said figures comprises essentially a bed 1 provided with horizontal runways 2 on which can be shifted a column 3 fitted with vertical runways 4 to guide the motion of a carriage 5 on which can slide horizontally a milling and boring headstock 6 in a direction parallel to that of the horizontal runways of bed 1, and provided with the usual spindle which is represented in Figs. 2 and 5 merely by its axis 7. Adjacent the bed 1 is a base 8 supporting a rotary table 9 intended to carry the workpiece 11.

The cutters used for gear-cutting are carried by a cutter head, the structure of which varies according to the kind of work to be done. First, a head will be described for the cutting of external helical spur gears by means of a hob, the feed of which is perpendicular to the axis thereof and directed towards the center of the gear blank to be cut. The manner in which the device can be simplified for the cutting of straight spur gear wheels will be explained. Also a head for cutting worm wheels by means of a taper hob will be described which is fed axially. Finally, two embodiments of heads for the cutting of internally toothed gears will be disclosed.

The cuter head represented in Figs. 1 to 6 corresponds to the first-named of the above mentioned types. It comprises a body 12 mounted on a support 13 itself secured to a plate 14 screwed on the front face 15 of the headstock 6. The cutter head 12 can be pivoted on the support 13 about an axis which coincides with the axis of the machine spindle 7 by means of a control gear consisting in a toothed sector 17 (shown in dotted lines in Fig. 6) rigid with the body of the head 12 and in mesh with a worm 18 housed in a casing 19 rigid with the support 13. One end of the worm 18 is provided with a square portion 21 which protrudes out of the casing 19 and which is intended to receive a crank adapted for adjusting the angular position of the head 12 with respect to the support 13. On the support 13 is a scale 22 which cooperates with a reference mark 23 carried by the head 12. This scale indicates in degrees the head pitch, whereas a scale 24 see Figs. 2 and 5 carried by the square portion 21 of the worm 18 cooperates with a reference mark 25 carried by the housing 19 so as to accurately show the minutes of the head pitch angle. The head 12 can be clamped on the support 13 by means of bolts 16. The cutter 27 is fitted to an arbor 28 which is rotatively supported in two bearings 29 and 30 secured to the head 12 by bolts 26, the heads of which are engaged in T-slots 31 cut in the front face of the head, said arbor being coupled through the medium of a sleeve 32 to a grooved shaft 33 on which is splined a gear 34 in mesh with a gear 35 connected, by means of a shaft represented in Fig. 5 by its axis 38, to a worm wheel 36 which is in mesh with a worm 37 driven from the machine spindle 7.

The shaft 33 is splined in the toothed wheel 34 so as to accommodate cutters of various sizes mounted on arbors of variable length, it being possible to adjust at will the position of the bearings 29 and 30 along the grooves 31 of the head 12.

Figure 3:
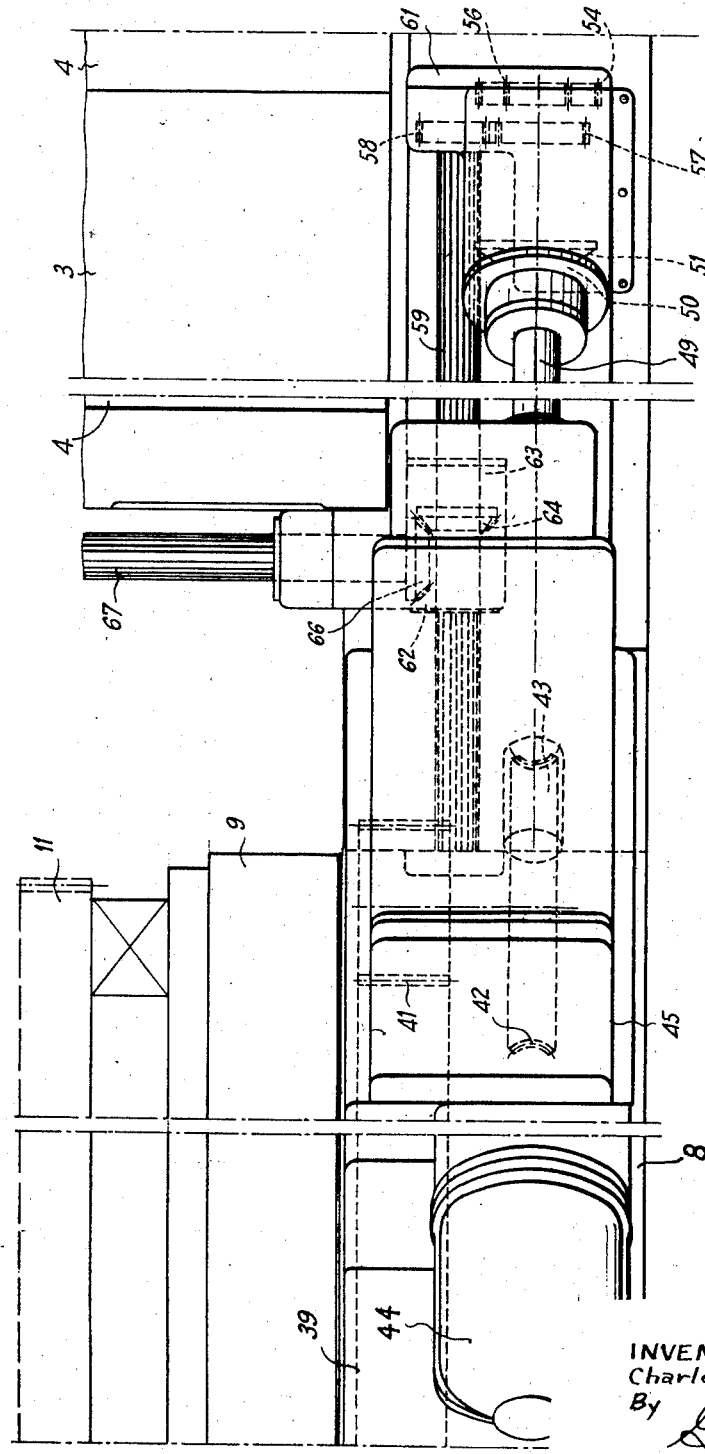
Fig. 3 is a similar view of another portion of the milling and boring machine of Fig. 1, namely of the portion carrying the device which controls the rotary table.
Figure 4:
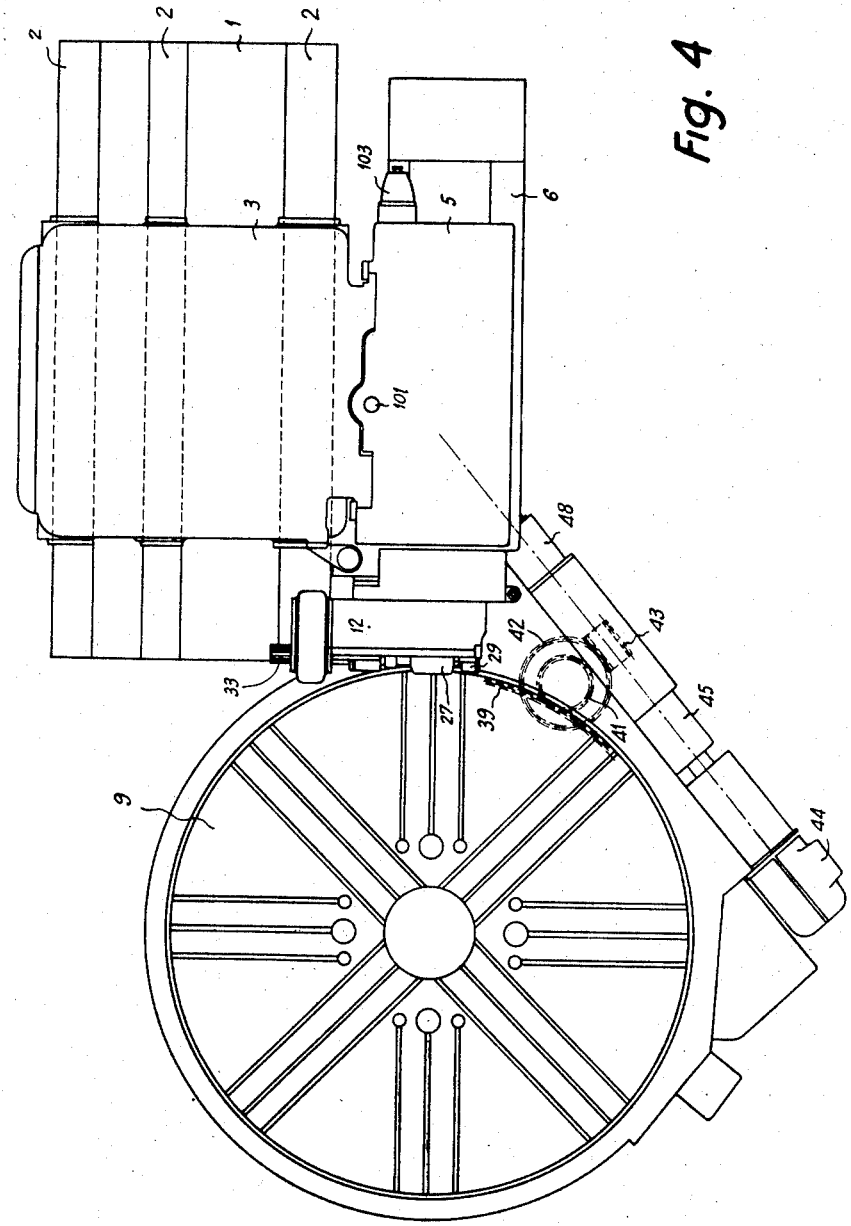
Fig. 4 is a general diagrammatic top view of the milling and boring machine shown in Fig. 1.

The transmission consists in a toothed ring 39, Figs. 3 and 4, rigid with table 9 and in mesh with a pinion 41 connected to a worm wheel 42 which is in mesh with a worm 43 driven by a powerful motor 44. This transmission is used in the example represented for vertical turning operations. It can also be used to carry out a mere angular feed or an indexing motion. For this purpose, it is necessary to provide a clutch 45 to isolate the vertical turning motor 44, so that the worm 43 can be driven by a feed motor 47, Fig. 5, through another clutch 48. However, if it is desired to perform gear-cutting operations by means of a hob, it is indispensable that the rotary motion of the table be linked positively with the rotary motion of the hob. In the example represented, this connection is ensured in the following manner: the worm 43, which rotates the table, is made rigid with a shaft 49 carrying a bevel pinion 50 in mesh with a further bevel pinion 51 carried by a shaft 53 on which is mounted a wheel 54 in mesh with a wheel 56 keyed on the same shaft which carries a wheel 57 in mesh with a wheel 58 fitted to the end of a splined shaft 59 supported at both ends in 61 and 62 in the bed 1. The splined shaft 59 passes through a casing 63 rigid with column 3 and enclosing a bevel gear 64 which is splined on the shaft 59 and which is in mesh with a bevel pinion 66 keyed on a vertical shaft 67 held, at its lower end, in the casing 63 and, at its upper portion, in a support 68 secured to the column 3 by means of screws 69. The vertical splined shaft 67 passes through a worm wheel 71 which is splined on this shaft and which is enclosed in the headstock carriage 5. This worm-wheel 71 is in mesh with a worm 72 splined on a short shaft 73 rigid with a toothed wheel 74 meshing with a toothed wheel 75 itself in mesh with a toothed ring 76 rigid with the machine spindle 7. The shaft 73 is splined in the wrom 72 so as to ensure a steady and correct transmission whatever may be the horizontal relative position of the headstock 6 and of the carriage 5, inasmuch as the shaft 73 is rigid with the wheel 74 which is mounted in the support 13 carried by the headstock, whereas the worm 72 is mounted in the headstock-supporting carriage 5.

With the device just described, it is possible to cut straight spur gears by means of a hob in the following manner: the wheel 11 to be cut is secured to the rotary table 9 co-axially thereto. Since the hob 27 has helical cutting edges, it is, of course, necessary to tilt the cutter-carrying arbor 28 by an angle corresponding to the helix angle of the hob. This can be done by first loosening the bolts 16 and turning the square portion 21 of the worm 18 while watching the scales 22 and 24 so as to bring the reference marks in register with the scale figure corresponding to the desired angle. Then, the bolts 16 are tightened again. The hob is brought to the appropriate height by moving the carriage 5 and the headstock 6 carried thereby upwardly or downwardly on the slideways 4 of the column 3. The depth of cut is adjusted by bringing the headstock 6 more or less near the axis of the table 9 either by shifting the column 3 along the runways 2 or, preferably, by causing the headstock 6 to slide horizontally on its carriage 5. The hob 27 is rotatably driven from the machine spindle 7 through the medium of gears 34, 35, 36 and 37, as stated above. The rotary feed motion of the table is controlled from the machine spindle 7 through the medium of the transmission, the elements of which have been described above, driving from the spindle 7 through toothed ring 76 to the vertical shaft 67 and through the horizontal shafts 59, 49 to the worm 43, worm wheel 42 and gears 41, 39.

To mill the teeth of the wheel 11 along their full width, it is sufficient to impart an appropriate vertical feed to the hob 27 and, to this effect, the vertical feed motion of the headstock-carrying carriage 5 is clutched on as about to be described.

The cutting of the straight spur wheel 11 can also be achieved by using a form cutter having a proper diametral pitch mounted in place of the hob 27. In this case, it is necessary to bring the cutter-carrying arbor 28 into an horizontal position and to cut separately each tooth of the wheel by imparting a vertical feed to the cutter. When the machining of one tooth is completed, the rotary table is then indexed for the machining of the next tooth. If a form cutter is being used, the connection between the spindle 7 and the table 9 becomes unnecessary, and the parts which form such connection, can be omitted if the machine is to work only with form cutters, or disconnected if it is desired to have a machine adapted to operate with either a hob or a form cutter.

When cutting helical gears while the hob is being shifted in the direction parallel to the axis of the workpiece, it is necessary to adjust progressively the angular position of the table relative to that of the cutter. For this purpose, the following complementary device can be also provided: instead of being rigid with the machine spindle 7, the toothed ring 76 (see Fig. 5) is mounted loose on said spindle and is in mesh with a pinion 78 rigid with a bevel sun wheel 79 of a differential, the planet gear-carrier 81 of said differential being rigid with a ring wheel 82 in mesh with another toothed wheel 83 rotatably connected to the machine spindle 7. The other sun wheel 84 of the differential is rigid with a worm wheel 86 in mesh with a worm 87 (see Fig. 6) mounted at the lower end of a shaft 88 (merely represented by its axis), which is carried by the headstock 6 and the upper end of which supports another worm 89. The worm 89 is in mesh with a worm-wheel 91 keyed on a shaft 92 (see Fig. 5) which is also carried by the headstock 6 and which is provided with splines, such splines cooperating with the complementary splines of a hollow shaft 93 carried by the headstock carriage 5. The shaft 93 can be connected by means of a coupling 94, to a shaft 96 provided with a worm 97 (see Fig. 2) in mesh with a wheel 98 itself in mesh with a worm 99 which is in mesh with a wheel 100, the hub of which forms a rotary nut screwed on a threaded rod 101 and which ensures the upward and downward motion of the headstock 6. The worm 99 is connected, by means of a shaft 102 (merely represented by its axis) to an electric motor 103 (see Fig. 1) which is carried by the headstock slide 5, and this powers the translational vertical shifting of the headstock 6 along column 3, as well as the driving of the differential.

The whole of the differential parts 79, 81, 84 and the wheels 76, 78 and 82, 83 is designed in such a way that when the headstock 6 is immobilized vertically, that is to say when the motor 103 is not running and when the coupling 94 is in mesh, the sunwheel 84 standing still, the toothed ring 76 rotates at the same angular speed as the wheel 83, i. e. at the same speed as the machine spindle 7.

By means of such a device, the cutting of helical spur wheels is performed in the following manner. First, the inclination of the cutter arbor 28 is adjusted by turning the square portion 21, as in the above mentioned example, then the depth of cut is set by adjusting the position of the headstock 6 on its carriage 5. During the cutting operation, the axial feed along the teeth is obtained by the vertical feed of the headstock-carrying slide 5 from the motor 103. In view of the structure of the device just described, it will be understood that if the coupling 94 is in mesh, the relative angular speed of the table 9 with respect to that of the cutter 27 is automatically corrected by the differential assembly 84—81—79, which introduces in the transmission of the system which drives the rotary table a supplementary rotational speed derived from the motor 103 which adds to the corresponding rotational speed of the cutter and which originates from the vertical shifting of the headstock, that is to say of the cutter.

When the machine is equipped to cut straight spur gears (as described above), as well as helical spur gears, it is necessary that the toothed wheel 76 be, at will, made rigid with the spindle (cutting of straight wheels), or mounted loose on same (cutting of helical wheels). To this effect, a clutching device, not shown, may be provided between the wheel 76 and the member which drives the spindle 7. On the other hand, the above mentioned coupling 94 makes it possible, when cutting helical wheels (clutch in mesh) to vary the rotational speed of the table 9 in accordance with the vertical feed of the headstock-carrying slide 5, or, when cutting straight wheels (clutch not in mesh), to make the motion of the table 9 independent of the up-and-down motion of the slide 5.

By referring more particularly to Figs. 7 and 8, another embodiment of a cutter head according to the invention will be described for the cutting of worm-wheels by means of a tapered hob or a fly-tool.

In the device previously described, it has been seen that the arbor 28 on which the cutter 27 is mounted, is supported in bearings 29, 30 carried by the head 12. In the present embodiment, the bearings 29, 30 are mounted in a similar way on a carriage 109 which is provided with T-grooves 114 and which slides in the cutter head 111 in the direction parallel to the axis of the cutter-carrying arbor 107. The carriage 109 is held on the cutter head 111 by means of flanges 112 secured to the head by means of the screws shown in Fig. 7 merely by their axes 113. The cutter 110 (Fig. 8) is rotatably driven in the same way as in the device previously described, namely: by a splined shaft 33 sliding in a toothed whel 34 in mesh with another toothed wheel 35 rigid with a worm wheel 36 in mesh with a worm 37 adapted to be driven by the machine spindle 7.

The axial motion of the cutter 110 supported by the carriage 109 is ensured by a worm-rack 115 (see Fig. 8) with oblique toothing cut directly in the base of the carriage 109 and in mesh with a worm 118 which is in mesh with a worm-wheel 119 supported by a shaft 121 on which a pinion 122 is splined. This pinion 122 is adapted to be in mesh with a wheel 123 mounted in the support 13 co-axially with the rotation axis of the head 111, the toothing of said wheel 123 being wide enough to be also in mesh with a pinion 125 rigid with a shaft 126 which can be connected, through the medium of a clutch 127, to a feed shaft 128 carried by the headstock 6. On shaft 126 is mounted a differential mechanism, a sunwheel 129 of which is rigid with shaft 126, whereas the planet-carrier 131 is rigid with a pinion 132 in mesh with the wheel 83 rigid with the machine spindle 7 and which has already been mentioned in the course of the description of the preceding device. The other differential sunwheel 133 is mounted loose on the shaft 126 and it is rigid with a pinion 134 which, in its turn, is in mesh with the toothed ring 76 mounted loose about the machine spindle 7, as already shown above, and which is in mesh with the pinion 75 driving, in its turn, the pinion 74 included in the gear controlling the rotational motion of table 9.

The operation of the device just described is achieved in the following manner:

The cutter head 111 is arranged in such a way that the cutter axis is placed in a horizontal position. The height of said axis is set by adjusting the vertical position of the headstock along column 3 so as to bring the cutter axis in the middle plane of the wheel 135 to be cut. The depth of cut is set by adjusting the position of the headstock 6 on its carriage 5 (or that of column 4 on its bed 2), and the carriage 109 is brought near the end of its path in the vicinity of the toothed wheel 34. The clutch 127 is put into mesh and when the clutch 94 previously described is included in the machine, care is taken that it is disconnected (see Figs. 2 and 5) so that the rotational motion of the table is not hindered by the drive of the vertical shifting of the headstock which stands still during the worm wheel cutting operation. The cutter 110 is rotatably driven from the spindle by gears 34, 35, 36, 37, and the cutter carried by the carriage 109 is longitudinally fed from the feed shaft 128 of the headstock through the medium of the gears 125, 123, 122, 119, 118 and of the rack 115. Considering the structure of the device just described, it is clear that the angular speed of the table 9 relative to that of the rotation of the cutter 110 is automatically corrected by the differential 129, 131, 133 which introduces in to the transmission of the rotary table a supplementary rotational speed which adds to the speed determined by the rotation of the spindle from which the cutter is driven and which corresponds to the longitudinal feed of carriage 109, that is to say of cutter 110.

When helical spur gears have to be cut with a machine modified in the manner I have justed described for cutting worm wheels, it is necessary to bring the clutch 127 into the neutral position and to put the clutch 94 in mesh for powering the headstock vertical feed, this because the feed to be imparted to the cutter is vertical and not longitudinal.

In Fig. 9 is represented a head 137 provided especially for the cutting of wheels with internal toothing by means of an end-mill 138 driven from the machine spindle through the medium of a connection assembly comprising two worm drives 139—140, 141—142. If it is desired to cut a toothed ring 151 with straight toothing, the feed of the cutter will be a mere vertical motion effected by headstock 6, the rotary table standing still during the cutting operations and being simply indexed each time the machining of another tooth is about to be started.

By means of this device, it is possible to cut toothed rings with internal helical toothing by imparting to the rotary table a rotational speed depending on the vertical feed of the cutter through the mechanism including clutch 94, but in this case, it is necessary to provide, between the member which drives the spindle 7 and the toothed wheel 83, a clutch device (which would be in mesh when cutting helical spur wheels and worm wheels, and disconnected when cutting rings with internal helical toothing), as well as a device to lock the wheel 83 in the headstock 6, which device would be unlocked when cutting helical spur wheels or worm wheels, and would be brought into the locking position when cutting rings with internal helical toothing, so that the rotation speed of the table depends only on the vertical feed of the cutter and is not effected by the cutter rotation. The cutting would be performed tooth after tooth and the table should be indexed by an amount corresponding to the toothing pitch every time another tooth is about to be machined.

Finally, Fig. 10 shows a variation of the head for internal cutting just described, by referring to Fig. 9, and in which the cutter 143 is a form cutter instead of being an end-mill. This cutter is also driven from the machine spindle 7 by means of a transmission device comprising three worm drives 144—145, 146—147, 148—149. This head 136 permits the cutting of gears with internal straight toothing and it can be used in the same manner as the head 137 which, in Fig. 9, is adapted to operate with an end-mill cutter.

Of course, the present invention is not restricted to the embodiments described and represented which are given merely by way of examples. For the above description, I have referred in particular to a milling and boring machine, the headstock 6 of which is horizontally shiftable on a carriage 5, but, of course, the invention is also applicable to milling and boring machines with a headstock adapted to slide directly along the vertical runways 4 of the column 3, in which case the shafts 73 and 93 need not be splined.

What I claim is:

1. A machine tool comprising a rotary table, means supporting said table for rotation thereof on a vertical axis, a column disposed adjacent said table in offset relation thereto transversely of said vertical axis of said table, a member supported by said column for vertical movement of said member on said column, a rotary spindle supported by said member for rotation of said spindle on an axis extending transversely of said vertical axis and parallel to the general direction from said column toward the vertical axis of said rotary table, a cutter arbor for carrying a rotatable cutter, means for supporting said cutter arbor on said member for rotation of said arbor on an axis extending transversely of the axis of said rotary table and transversely of said spindle axis, means operatively connecting said cutter arbor to said spindle for effecting rotation of said arbor upon rotation of said spindle, a differential mechanism, means providing a driving connection through said differential mechanism between said rotary table and said rotary spindle for effecting rotation of said rotary table in differential relation to said spindle upon rotation of said spindle and upon differential operation of said differential mechanism, means operatively connected to said member and to said column and operable for effecting vertical feeding movement of said member on said column, and means providing a driving connection through said differential mechanism between said vertical feeding means and said rotary table for effecting upon differential operation of said differential mechanism differential vertical feeding movement of said member and said cutter arbor supporting means and said cutter carried by said arbor relative to said rotation of said rotary table and relative to said rotation of said spindle and of said arbor.

2. A machine tool comprising a rotary table, means supporting said table for rotation thereof on a vertical axis, a rotary spindle, means supporting said spindle for rotation of said spindle on an axis extending transversely of said vertical axis and parallel to the general direction from said spindle toward the vertical axis of said rotary table, a cutter arbor for carrying a rotatable cutter, means supporting said cutter arbor for rotation of said arbor on an axis extending transversely of the axis of said rotary table and transversely of said spindle axis and for feeding movement of said cutter arbor parallel to said axis of said arbor, means operatively connecting said cutter arbor to said spindle for effecting rotation of said arbor and said cutter upon rotation of said spindle, a differential mechanism, means providing a driving connection through said differential mechanism between said rotary table and said rotary spindle for effecting rotation of said rotary table in differential relation to said spindle upon rotation of said spindle and upon differential operation of said differential mechanism, means operatively connected to said cutter arbor supporting means and operable for effecting said feeding movement of said cutter arbor supporting means and said cutter carried by said arbor parallel to said axis of rotation of said arbor, and means providing a driving connection through said differential mechanism between said rotary spindle and said cutter arbor feeding means for effecting said cutter arbor feeding movement in differential relation to the rotation of said rotary table and in differential relation to the rotation of said rotary spindle and of said cutter arbor.

3. A machine tool comprising a rotary table, means supporting said table for rotation thereof on a vertical axis, a column disposed adjacent said table in horizontally offset relation to the vertical axis of said table, a member supported by said column for vertical movement of said member on said column, a rotary spindle supported by said member for rotation of said spindle on a horizontal axis extending in the general direction from said column toward the vertical axis of said rotary table, a cutter arbor for carrying a rotatable cutter, means supported by said member for supporting said cutter arbor for rotation of said arbor on an axis extending transversely of the axis of said rotary table and transversely of said spindle axis, said cutter arbor supporting means being supported by said member for movement of said cutter arbor supporting means and said arbor parallel to said axis of said arbor, means operatively connecting said cutter arbor to said spindle for effecting rotation of said arbor and cutter upon rotation of said spindle, a differential mechanism, means providing a driving connection through said differential mechanism between said rotary table and to said rotary spindle for effecting rotation of said rotary table in differential relation to said spindle upon rotation of said spindle and upon differential operation of said differential mechanism, means operatively connected to said cutter arbor supporting means and to said member and operable for effecting relative to said member feeding movement of said cutter arbor supporting means and said cutter arbor parallel to said axis of rotation of said arbor, means providing a driving connection through said differential mechanism between said cutter arbor feeding means and said rotary table for effecting said feeding movement of said cutter arbor parallel to said cutter arbor axis in differential relation to said rotation of said rotary table upon differential operation of said differential mechanism, means operatively connected to said member and to said column and operable for effecting vertical feeding movement of said member and said cutter arbor on said column, and means providing a driving connection through said differential mechanism between said member moving means and said rotary table for effecting said vertical feeding movement of said member and said arbor on said column in differential relation to said rotation of said rotary table upon differential operation of said differential mechanism, said driving connections through said differential mechanism between said two feeding means and said rotary table comprising means selectively operable to establish and disestablish said driving connections respectively to effect said movement of said cutter arbor parallel to said axis of said arbor and to effect said vertical movement of said member on said column.

4. A machine tool as defined in claim 1 in which said means for effecting vertical movement of said member on said column comprises a feed screw supported on said column with the axis of said feed screw vertical, a rotary nut supported on said member in threading engagement with said feed screw and for rotation of said nut on the axis of and relative to said screw for effecting said vertical feeding movement of said member upon rotation of said nut, said differential mechanism having a given sun wheel operatively connected to said rotary nut for effecting rotation of said given sun wheel upon rotation of said nut, said differential mechanism having another sun wheel, operatively connected to said rotary table for rotation of said other sun wheel upon rotation of said table, said differential mechanism having a planet wheel carrier operatively connected to said rotary spindle for rotation of said carrier upon rotation of said spindle, a planet wheel supported by said carrier in engagement with said sun wheels for producing upon rotation of said nut and said given sun wheel operatively connected thereto rotation of said spindle and said rotary table in differential relation to each other and differential vertical feeding movement of said member and said cutter arbor relative to said rotation of said rotary table and relative to said rotation of said spindle and said arbor, and independently operable means operatively connected to said nut for effecting rotation of said nut and said given sun wheel for effecting differential operation of said differential mechanism.

5. A machine tool comprising a rotary table, means for supporting said table for rotation thereof on a vertical axis, a rotary spindle, means supporting said spindle for rotation of said spindle on an axis extending transversely of said vertical axis of said rotary table in the general direction toward said vertical axis of said rotary table, a cutter arbor for carrying a rotatable cutter and disposed with the axis of said arbor extending transversely of said axis of said table and transversely of said spindle axis, a carriage supported by said spindle supporting means for rectilinear movement of said carriage parallel to said cutter arbor axis and supporting said arbor for said movement therewith, means operatively connecting said spindle to said arbor for rotation of said arbor upon rotation of said spindle, a differential mechanism having a pair of sun wheels, a given sun wheel of said differential mechanism being operatively connected to said rotary table for rotation of said given sun wheel upon rotation of said table, a planet wheel carrier operatively connected to said rotary spindle for rotation of said carrier upon rotation of said spindle, the other of said sun wheels being operatively connected to said carriage for effecting movement of said carriage parallel to said axis of said arbor upon rotation of said other sun wheel, and a planet wheel carried by said planet wheel carrier and engaging both sun wheels for effecting differential rotation of said given sun wheel and said planet wheel carrier with respect to said other sun wheel upon operation of said other sun wheel to effect rotation of said rotary table in differential relation to the rotation of said spindle and said cutter arbor and differential movement of said carriage and of said cutter arbor in relation to said rotary table and to said rotation of said cutter arbor.

6. A machine tool comprising a rotary table, means supporting said table for rotation thereof on a vertical axis, a cutter arbor for carrying a rotatable cutter, a member supporting said cutter arbor for rotation thereof on its axis, means supporting said member for movement thereof generally vertically and with said axis of said arbor extending transversely of and in offset relation to said axis of said table to provide for feeding movement of said arbor and cutter relative to said rotary table upon said vertical movement of said member, means operatively connected to said member and operable to effect said generally vertical movement of said member, means operatively connected to said cutter arbor for effecting rotation of said arbor, a differential mechanism, means providing a driving connection through said differential mechanism between said rotary cutter arbor and said rotary table to effect differential rotation of said cutter arbor and table relative to each other, and means providing a driving connection through said differential mechanism between said cutter arbor and said means for effecting said vertical feeding movement of said member and arbor to effect differential rotation of said cutter arbor with respect to said feeding movement of said member and arbor.

7. A machine tool as defined in claim 6 which comprises clutching means provided in said driving connection through said differential mechanism between said cutter arbor and said means for effecting vertical feeding movement of said member and operable to connect said feeding means to and to disconnect said feeding means from said differential mechanism for securing at will said vertical feeding movement in said differential relation to said rotation of said rotary table and in differential relation to said rotation of said arbor.

References Cited in the file of this patent
UNITED STATES PATENTS

| | | |
|---|---|---|
| 1,633,714 | Schwab | June 28, 1927 |
| 2,073,917 | Zimmermann | Mar. 16, 1937 |
| 2,263,404 | Armitage | Nov. 18, 1941 |
| 2,345,060 | Morton | Mar. 28, 1944 |
| 2,364,932 | Warner et al. | Dec. 12, 1944 |
| 2,374,255 | Davenport | Apr. 24, 1945 |
| 2,419,726 | Pelphrey | Apr. 29, 1947 |